United States Patent [19]

Grabb et al.

[11] 4,223,903

[45] Sep. 23, 1980

[54] INTEGRAL SUSPENSION MEMBER

[75] Inventors: Frederick G. Grabb; James K. Roberts, both of South Bend, Ind.

[73] Assignee: The Bendix Corporation, Southfield, Mich.

[21] Appl. No.: 904,352

[22] Filed: May 9, 1978

[51] Int. Cl.[3] .......... B60G 7/00; B60T 1/06

[52] U.S. Cl. .......... 280/96.1; 280/660; 280/666; 280/668; 280/697; 188/18 R

[58] Field of Search .......... 188/18 R, 18 A; 280/697, 80 R, 690, 698, 701, 668, 96.1, 924, 660, 663, 666

[56] References Cited

U.S. PATENT DOCUMENTS

| | | | |
|---|---|---|---|
| 1,990,344 | 2/1935 | Newhouse | 180/75 |
| 2,397,296 | 3/1946 | Scribner | 280/80 R |
| 2,547,268 | 4/1951 | Jacobi | 188/18 R |
| 2,718,409 | 9/1955 | Kishline | 280/697 |
| 2,831,699 | 4/1958 | Holmes | 280/80 R |
| 3,163,440 | 12/1964 | Vail | 280/80 R |
| 3,270,830 | 9/1966 | Barrett et al. | 180/75 |
| 3,749,415 | 7/1973 | Sampatacos | 280/96.1 |
| 3,767,221 | 10/1973 | Asberg | 280/96.1 |
| 3,865,394 | 2/1975 | Epner et al. | 280/96.1 |
| 3,908,480 | 9/1975 | Afanador et al. | 280/96.1 |
| 4,150,736 | 4/1979 | Marti | 188/18 R |

*Primary Examiner*—Robert R. Song
*Attorney, Agent, or Firm*—Paul David Schoenle; Ken C. Decker

[57] ABSTRACT

The present invention relates to a suspension member which cooperates with a bracket, a traction bar, and a shock absorber in order to connect a wheel assembly to a vehicle frame. The suspension member comprises a sheet of metal which is deformed to receive and fixedly secure a spindle which rotatably supports a wheel assembly. The suspension member is engageable with a brake assembly to support the latter relative thereto and also opposes torque developed during braking. In a preferred embodiment the suspension member comprises a pair of metal sheets which are deformed to form mirror images of each other so that upon fastening, they support the spindle and cooperate with the brake assembly to provide braking for the wheel assembly.

10 Claims, 25 Drawing Figures

INTEGRAL SUSPENSION MEMBER

BACKGROUND OF THE INVENTION

In a front wheel drive vehicle the rear wheels are carried by a support assembly for connection with the rear of the vehicle frame. Generally, the rear axle shaft is replaced by separate spindles at each of the rear wheels and a forged member supports the spindle. The forged member also supports a backing plate for the purpose of carrying a brake assembly, and couples to a bracket, a traction bar, and a strut, such as a Macpherson strut, in order to mount the forged member relative to the vehicle frame. Although the foregoing support assembly has been satisfactory, changes in design objectives such as weight and cost have limited the desirability for such a support assembly. Consequently, a new support assembly which is light weight is believed to be an advance in the state of the art.

SUMMARY OF THE INVENTION

The present invention relates to a suspension member which is used in a rear support assembly for a front drive vehicle. In particular, the suspension member comprises a support which is formed from a stamped piece of metal. Preferably, the stamped support is constructed from a pair of stamped members which are mirror images of each other. When coupled together the stamped members form a vertical seam which is welded together to form the support.

In addition, the suspension member includes means, such as a dust shield, for supporting a brake assembly. Preferably, the dust shield carries a wheel cylinder and holddown springs attach a pair of brake shoes to the dust shield. The pair of brake shoes are engageable with the support to anchor the brake shoes thereto. Therefore, torque developed during braking is transferred to the support rather than through the wheel cylinder.

In a modified embodiment of the present invention, the support carries the wheel cylinder and forms an anchor to carry the pair of brake shoes and to oppose torque developed during braking.

It is a primary object of the present invention to provide a support for a suspension member which fixedly secures a spindle for rotatably carrying a wheel assembly and to integrate a brake assembly with the support for cooperating with the wheel assembly to retard rotation of the latter.

DETAILED DESCRIPTION

Figure 1:
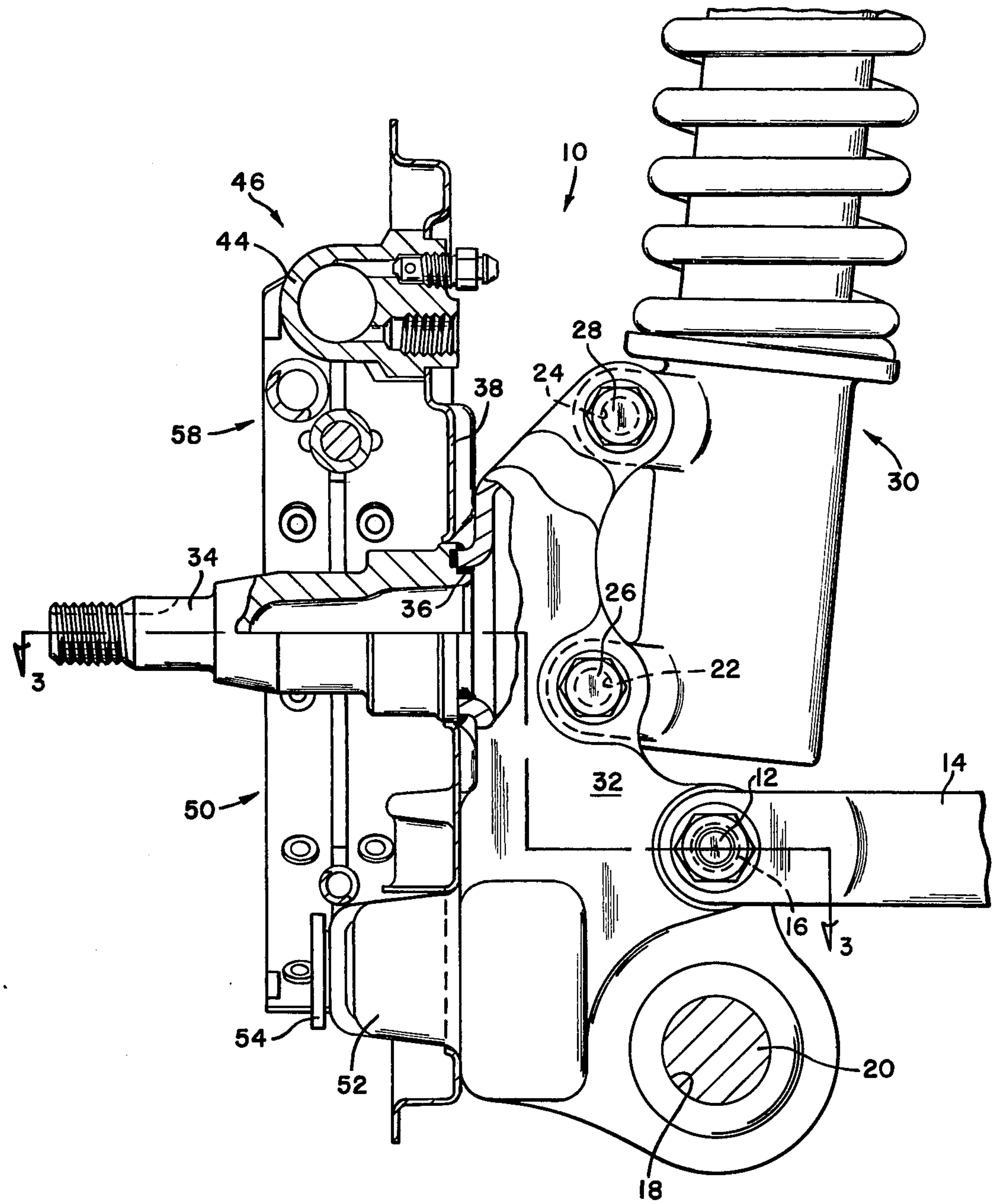
FIG. 1 is a side view of a support assembly showing the suspension member of the present invention.

In FIG. 1 the suspension member of the present invention is illustrated at 10. The suspension member 10 is pivotally connected via pin 12 with a bracket 14 which is pivotally anchored to the rear of a vehicle frame (not shown). The pin 12 extends through coaxial apertures at 16 on the suspension member 10, and coaxial apertures at 18 are adapted for connection with a traction bar 20. Opposite the aperture 18, a pair of coaxial apertures 22 and 24 receive pins 26 and 28 to secure a shock absorber assembly 30, such as a Macpherson strut which is well known in the industry.

Figure 2:
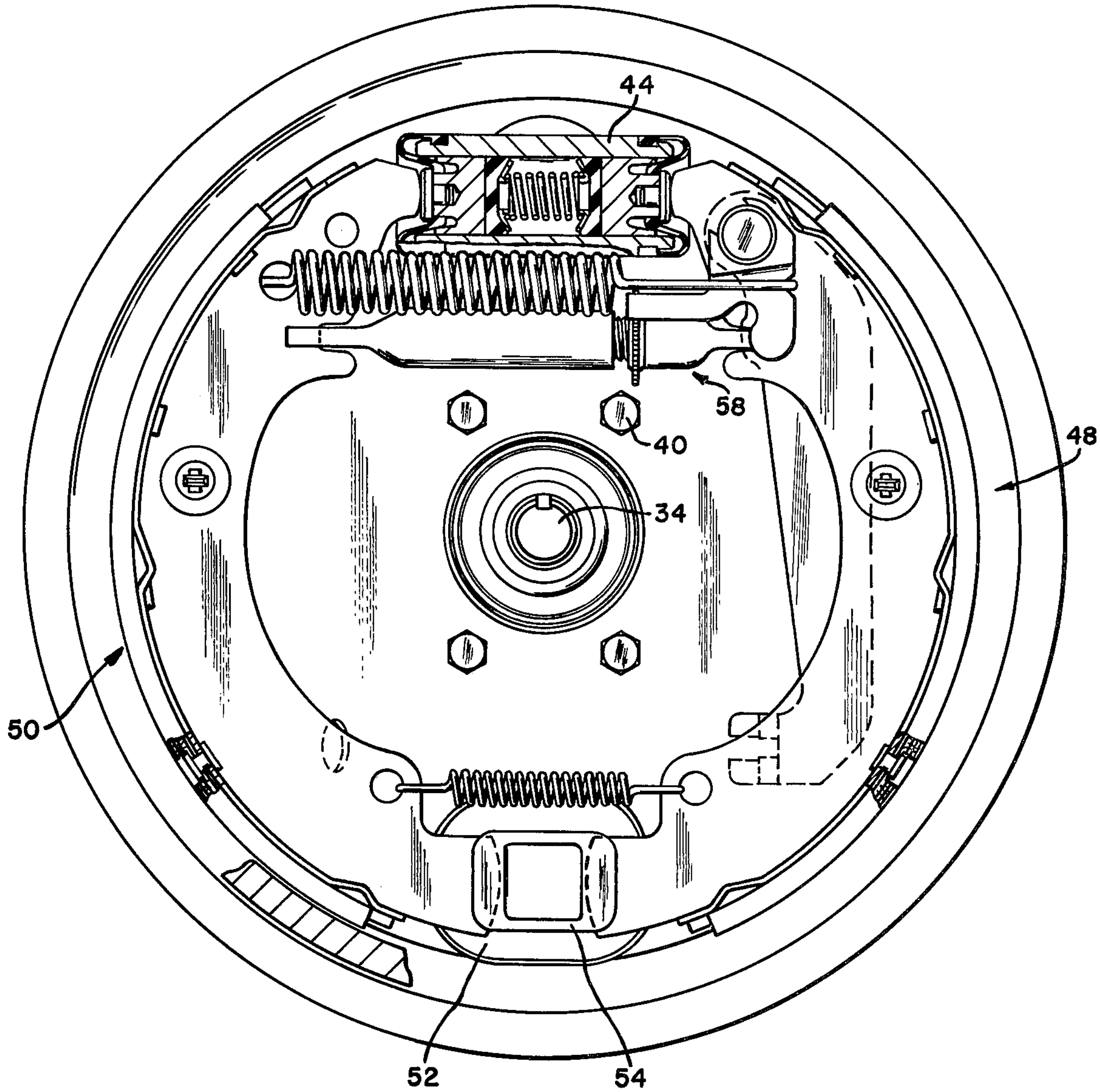
FIG. 2 is a front view of the support assembly of FIG. 1.

In accordance with the invention the suspension member 10 comprises a support 32 which is constructed from a stamped sheet of metal, as described hereinafter. The support 32 fixedly secures a spindle 34 by means of welds at 36 or other suitable fastening technology. The suspension member 10 also includes a dust shield 38 which is secured to the support 32 via bolts 40, see FIG. 2. The dust shield forms an opening 42 for receiving a wheel cylinder 44 of a brake assembly 46 and the brake assembly 46 includes a pair of brake shoes 48 and 50 which are pivotally anchored to the support 32 at an axially extending boss 52. A plate 54 is fastened to the boss 52 by any suitable means to limit axial separation between the brake shoes 48 and 50 and the boss 52. In the alternative the boss 52 can be slit and deformed to define an anchor plate to oppose braking torque.

A conventional parking brake mechanism and automatic adjustment mechanism 58 extends between the brake shoes 48 and 50.

Figure 3:
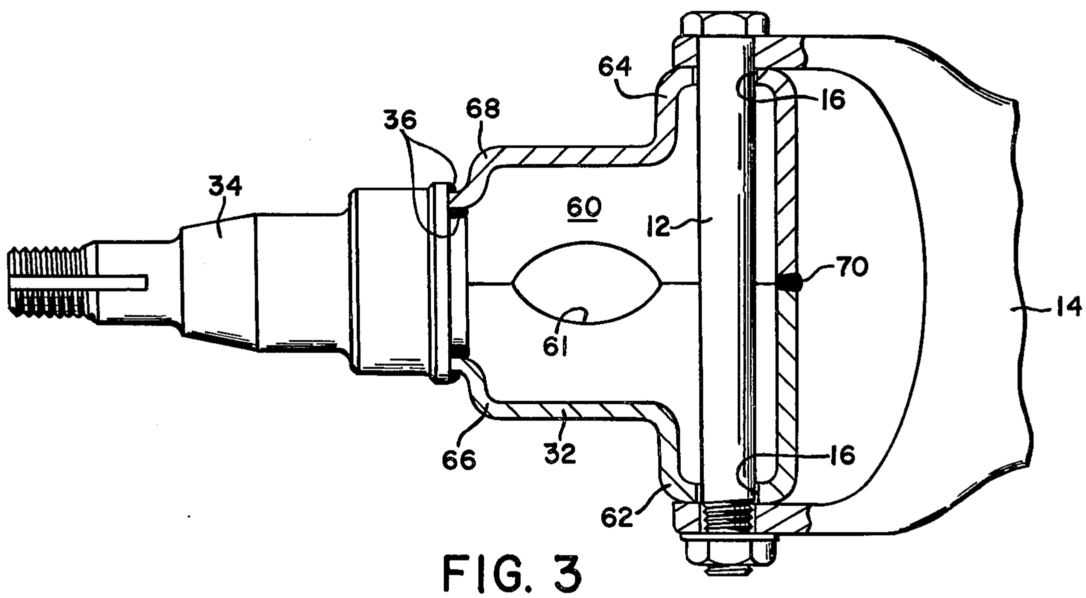
FIG. 3 is a cross section view of the support and spindle taken along line 3—3 of FIG. 1.
Figure 4:
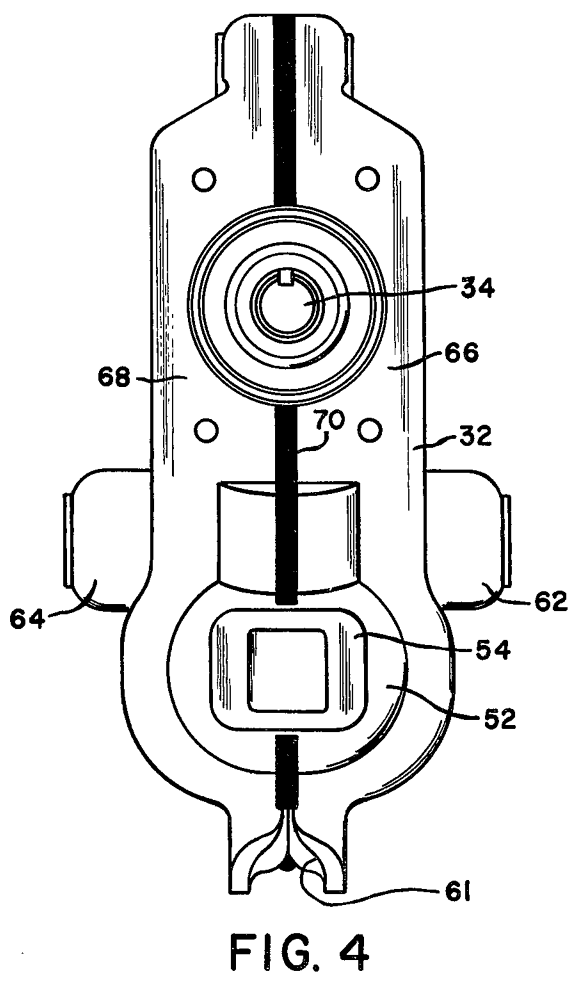
FIG. 4 is a front view of the support and spindle.

Turning to FIGS. 3 and 4 it is seen that the support 32 is hollow to form a cavity 60 with a drain opening 61. Transversely extending projections at 62 and 64 define the coaxial apertures 16. The support is preferably constructed from a pair of stamped members 66 and 68 which are mirror images of each other. In other words the seam 70 between the stamped members 66 and 68 as shown in FIG. 4 is substantially vertical and lies in a plane of symmetry of the support 32. The seam 70 is welded by gas or arc welding to form the support 32.

Figure 5:
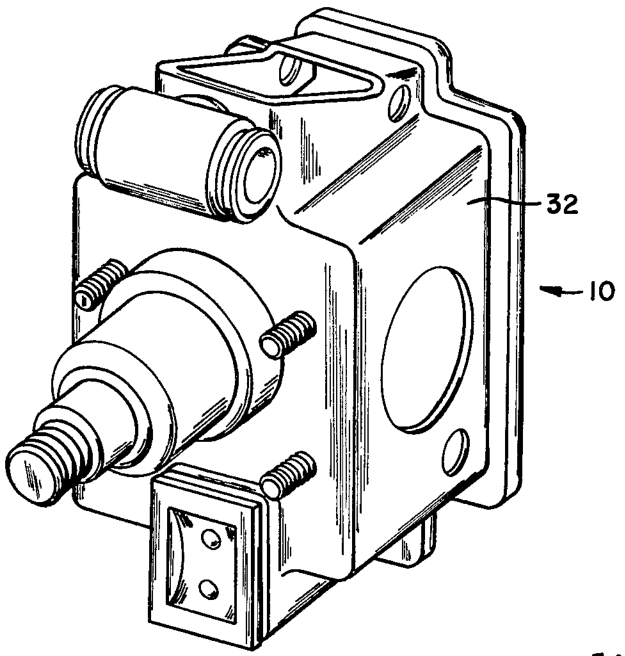
FIG. 5 is a reduced perspective view of a modified embodiment of the support.
Figure 6:
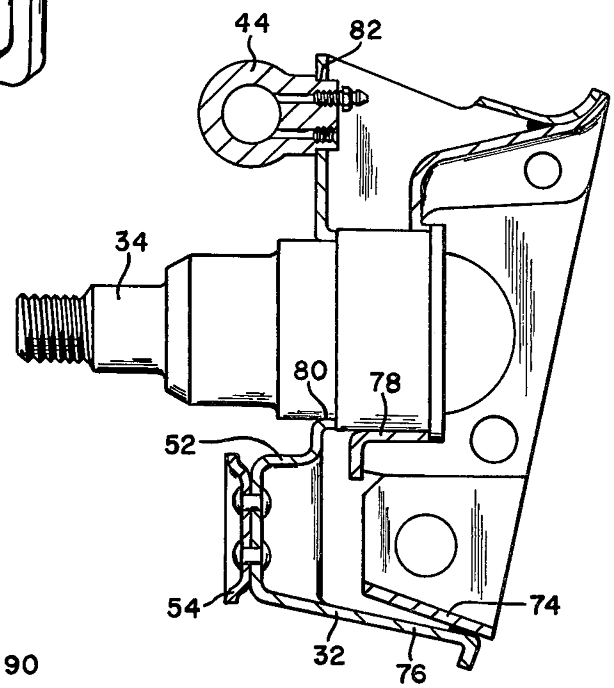
FIG. 6 is a vertical cross section view of the modified embodiment of FIG. 5.

The modified embodiment of FIGS. 5 and 6 shows an inner shell 74 and an outer shell 76 which are fastened together by welding or other suitable means to form the support 32. The support 32 of FIGS. 5 and 6 forms coaxial openings at 78 and 80 which are formed on the inner and outer shells, respectively, in order to receive and support the spindle 34. In addition, the outer shell 76 of the support 32 includes the boss 52 and forms an opening 82 for receiving the wheel cylinder 44 of a brake assembly 46 (not shown). As the support 32 carries the wheel cylinder and forms the anchor boss 52, it is possible to transmit braking torque to the anchor boss 52, as well as to the wheel cylinder 44 with this embodiment. The inner and outer shells are apertured to receive pins for connection with the shock absorber assembly and the bracket and to couple with the traction bar. With the embodiment of FIGS. 5 and 6 it will be appreciated that the strength of a forged support is believed to be substantially duplicated without the inconvenience of the weight of the forged support and a brake assembly is integrally incorporated with the structure of the stamped support 32.

Figure 7:
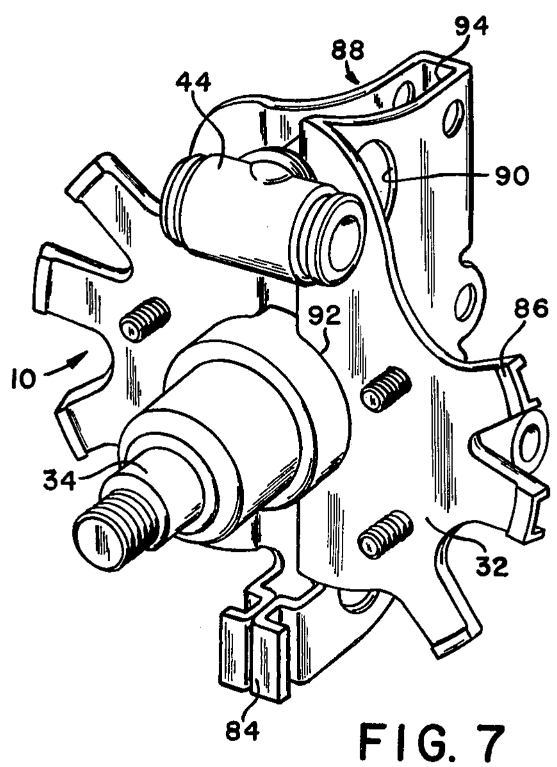
FIG. 7 is a reduced perspective view of another modified embodiment of the support.

In the modified embodiment of FIG. 7 the support 32 is constructed from a single sheet of metal which is deformed to a substantially T shape in horizontal cross section. The support 32 secures the wheel cylinder 44 and forms the anchor plate 84 opposite the wheel cylinder 44. Moreover, the support 32 includes a plurality of fingers at 86 to cooperate with a pair of brake shoes (not shown) so as to guide the radial expansion and contraction thereof. The folded portion 88 of the T-shaped support 32 is apertured to provide for connection with the shock absorber assembly and the bracket. In addition, the folded portion 88 is cut out at 90 to receive the wheel cylinder 44 and is enlarged at 92 to receive the spindle 34. The cutout permits fluid communication to the wheel cylinder and the enlarged portion is fastened to the spindle 34 to fixedly secure the latter to the support 32. The fastening between the spindle 34 and the enlarged portion 92 of the folded portion 88 not only prevents the spindle from separating from the plate 32 but also prevents spreading of the fold 94 so as to retain the wheel cylinder 44 within the cutout 90.

The brake assembly 46 is coupled to the suspension member 10 so that a single installation operation will attach the brake assembly 46 and the suspension member 10 to the vehicle. In addition, the suspension member 10 fixedly secures the spindle 34, carries the brake assembly 46 and opposes torque developed during braking.

After installation on the vehicle frame the brake assembly 46 and suspension member cooperate in a conventional manner to mount a wheel assembly and to provide for retarding rotation of the latter.

Although the shock abosorber 30 is illustrated in attachment with the support 32, it is possible to anchor the shock absorber 30 on the bracket 14 as movement of the support 32 during driving will also be manifested in movement of the bracket 14. In addition, the coil spring shown with the shock absorber assembly 30 can be separated therefrom to anchor on the bracket 14.

Another modification of the present invention, which is not shown, provides for eliminating the boss 52 in the embodiments of FIGS. 5–7, so that torque developed during braking is transmitted through the wheel cylinder 44 to the support 32, or through an anchor pin adjacent the wheel cylinder 44 and extending from the support 32.

In comparison with a conventional suspension system the present suspension member substantially incorporates the functions of a backing plate within the suspension member, which also functions to support the spindle.

Many variations of the present invention are feasible by one skilled in the art and as such are intended to fall within the scope of the appended claims.

We claim:

1. A vehicle road wheel suspension comprising:

a suspension member having a pair of substantially mirror image portions secured one to another and defining a plane of symmetry;

a spindle for rotatably carrying a road wheel assembly and having an axis, a free end, a fixed end, and being carried by said member at said fixed end with its axis substantially in said plane of symmetry;

said member including means for carrying a wheel brake assembly;

each of said portions defining an aperture coaxially aligned with a corresponding aperture in the other portion;

said member being pivotally attached to a vehicle suspension bracket by a pin passing through said apertures and engaging said bracket.

2. The suspension of claim 1 wherein said member further includes means spaced from said spindle and projecting substantially parallel thereto in a direction toward said free end thereof for cooperating with said brake assembly and for resisting torque developed thereby during braking.

3. The suspension of claim 2 wherein said projecting means includes a boss defined on said member and lying in said plane of symmetry, said boss cooperating with at least one of the friction elements of said brake assembly to resist torque developed thereby during braking.

4. The suspension of claim 3 wherein said boss is defined by cooperating parts of said mirror image portions lying adjacent said plane of symmetry, whereby said plane passes substantially through the center of said boss.

5. The suspension of claim 1, 2, 3 or 4 wherein said member further includes at least two spaced openings, each of said openings being defined by a pair of coaxially aligned apertures in said mirror image portions, said member being fixedly attached to a shock absorber strut by pins passing through said openings and engaging said strut.

6. The suspension of claim 1, 2, 3 or 4 wherein said mirror image portions are each a sheet of metal stamped to be a mirror image of the other, said portions each defining a face which corresponds to the face of the other whereby said portions, when joined at said faces, define a plane of symmetry.

7. The suspension of claim 6 wherein said portions together define an aperture in said member at the plane of symmetry for receiving said spindle fixed end.

8. In a vehicle suspension, a suspension member, a suspension bracket, means pivotally connecting the suspension member to the suspension bracket, a spindle for carrying a wheel, said spindle having a pair of opposite ends, one of said ends being secured to one face of said suspension member so that the other end of the spindle projects away from the one face of the suspension member, and torque taking abutment means projecting from said one face of the suspension member in the same general direction as the spindle projects, and a drum brake assembly carried by said suspension member, said drum brake including a dust shield, a pair of apertures in said dust shield for receiving said spindle and said torque taking abutment means, means securing said dust shield on said one face of said suspension member, a pair of brake shoes movably mounted on said dust shield, and means for moving said brake shoes, said brake shoes having a pair of contiguous ends, said torque taking abutment means having a pair of edges, the contiguous ends of said brake shoes engaging said edges of the torque taking abutment when a brake application is effected whereby a substantial portion of the braking torque generated by said brake shoes during a brake application is transmitted directly to said torque taking abutment without being transmitted through said dust shield.

9. The invention of claim 8:

and a shock absorber assembly rigidly secured to said suspension bracket.

10. The invention of claim 8:

wherein said suspension member is made from a pair of components, said components being substantially mirror images of one another and being joined to define a plane of symmetry and to form said suspension member, the axis of said spindle and the axis of the torque taking abutment being in the same plane as the plane of symmetry of said suspension member.

* * * * *